(12) United States Patent
Zorn et al.

(10) Patent No.: US 10,336,849 B2
(45) Date of Patent: Jul. 2, 2019

(54) COPOLYMER COMPRISING OXAZOLINE MONOMERS AND USE THEREOF AS CROSSLINKER

(71) Applicant: BASF SE, Ludwigshafen (DE)

(72) Inventors: Matthias Zorn, Weinheim (DE);
Yvonne Dieckmann, Hassloch (DE);
Iris Peters-Steuer, Lambsheim (DE);
Kathrin Michl, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 263 days.

(21) Appl. No.: 15/321,116

(22) PCT Filed: Jun. 24, 2015

(86) PCT No.: PCT/EP2015/064196
§ 371 (c)(1),
(2) Date: Dec. 21, 2016

(87) PCT Pub. No.: WO2015/197662
PCT Pub. Date: Dec. 30, 2015

(65) Prior Publication Data
US 2017/0152333 A1    Jun. 1, 2017

(30) Foreign Application Priority Data

Jun. 26, 2014    (EP) .................................... 14174076

(51) Int. Cl.
| | | |
|---|---|---|
| *C08F 220/18* | (2006.01) | |
| *C08F 212/08* | (2006.01) | |
| *C08F 220/38* | (2006.01) | |
| *C09D 125/14* | (2006.01) | |
| *C09D 133/12* | (2006.01) | |
| *C09J 125/14* | (2006.01) | |
| *C09J 133/12* | (2006.01) | |

(52) U.S. Cl.
CPC .......... *C08F 220/18* (2013.01); *C08F 212/08* (2013.01); *C08F 220/38* (2013.01); *C09D 125/14* (2013.01); *C09D 133/12* (2013.01); *C09J 125/14* (2013.01); *C09J 133/12* (2013.01); *C08F 2810/20* (2013.01); *C09J 2205/114* (2013.01); *C09J 2425/00* (2013.01); *C09J 2433/00* (2013.01)

(58) Field of Classification Search
CPC .... C08F 220/18; C08F 212/08; C08F 220/38; C08F 2810/10; C09D 125/14; C09D 133/12; C09J 125/14; C09J 133/12; C09J 2205/114; C09J 2425/00; C09J 2433/00
USPC ........................................................ 524/516
See application file for complete search history.

(56) References Cited

U.S. PATENT DOCUMENTS

| | | | |
|---|---|---|---|
| 2,897,182 | A | 7/1959 | De Benneville et al. |
| 3,509,235 | A | 4/1970 | Riemhofer et al. |
| 5,300,602 | A | 4/1994 | Arita et al. |
| 6,231,876 | B1 | 5/2001 | Niessner et al. |
| 2006/0035070 | A1 | 2/2006 | Kitazawa et al. |
| 2006/0183822 | A1 | 8/2006 | Nguyen-Kim et al. |
| 2013/0330590 | A1 | 12/2013 | Toyoda |

FOREIGN PATENT DOCUMENTS

| | | | | |
|---|---|---|---|---|
| EP | 1 612 238 | A1 | 1/2006 | |
| EP | 2 680 343 | A1 | 1/2014 | |
| EP | 2680343 | A1 * | 1/2014 | .......... H01M 2/1653 |
| JP | 5-271598 | | 10/1993 | |
| JP | 7-102482 | | 4/1995 | |
| JP | 10-251474 | | 9/1998 | |
| JP | 2000-7980 | | 1/2000 | |
| JP | 2001-310914 | A | 11/2001 | |
| JP | 2008-69249 | A | 3/2008 | |
| RU | 2 186 559 | C2 | 8/2002 | |
| WO | WO 98/14164 | A2 | 4/1998 | |
| WO | WO 2004/058837 | A2 | 7/2004 | |
| WO | WO 2010/074202 | | 7/2010 | |
| WO | WO 2010/098380 | | 9/2010 | |

OTHER PUBLICATIONS

EIC Search—Jan. 23, 2019 (Year: 2019).*
Office Action dated Dec. 3, 2018 in Russian Patent Application No. 2017102385/04, 10 pages (with English translation of categories of cited documents).
International Search Report dated Sep. 10, 2015 in PCT/EP2015/064196 filed Jun. 24, 2015.
Notification of Reasons for Refusal dated Feb. 18, 2019 in Japanese Patent Application No. 2016-575359 issued Jun. 24, 2015.

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

The present application relates to novel copolymers and processes for the preparation thereof, where the copolymers comprise, as building blocks:
a $C_{1-20}$-alkyl (meth)acrylate and/or $C_{8-20}$-vinylaromatics (monomer a);
a monoethylenically unsaturated, hydrophilic monomer comprising at least one sulfonic acid group (—$SO_3M$) (monomer b); and
a monoethylenically unsaturated monomer comprising at least one oxazoline group (monomer c);
and where the fraction of the monomers a) and b) is in total less than 50% by weight, based on the total amount of the monomers in the copolymer A.

16 Claims, No Drawings

COPOLYMER COMPRISING OXAZOLINE MONOMERS AND USE THEREOF AS CROSSLINKER

The present application relates to novel copolymers and processes for the preparation thereof, where the copolymers comprise, as building blocks:

a $C_{1-20}$-alkyl (meth)acrylate and/or $C_{8-20}$-vinylaromatics (monomer a);

a monoethylenically unsaturated, hydrophilic monomer comprising at least one sulfonic acid group ($—SO_3M$) (monomer b); and a monoethylenically unsaturated monomer comprising at least one oxazoline group (monomer c);

and where the fraction of the monomers a) and b) is in total less than 50% by weight, based on the total amount of the monomers in the copolymer A.

The present invention further relates to the use of the copolymers according to the invention as crosslinkers, in particular as crosslinkers for acrylic acid-containing polymers, such as, for example, film-forming polyacrylic acid lattices, resins or solution polymers. The present invention further relates to crosslinking compositions comprising the copolymers according to the invention.

Film-forming polyacrylic acid lattices, e.g. polymer dispersions of the Acronal® series (BASF SE, Ludwigshafen) can serve for example as binders or for the coating of surfaces. These can be used for example in the coating and production of wood products, such as particle boards, wood panels, cork products, parquet, cardboard, paper products, such as paper, or paperboard, wallpaper, or for the impregnating of wood.

As a result of adding crosslinkers, i.e. polyfunctional compounds, which are able to react in particular with the free carboxy groups of the lattices, crosslinking systems are obtained which cure for example at elevated temperatures. Such crosslinking systems are often used in the production of adhesives, sealants, synthetic resin renders, paper coating slips, fiber nonwovens, flexible roof coverings and paints, and also in sand consolidation, as a component in the production of textile or leather auxiliaries and impact modifiers or for modifying mineral binders and plastics.

Oxazoline-functionalized polymers and their use for crosslinking polycarboxylic acids are described in the prior art. The oxazoline groups react with carboxy groups, phosphate groups, phenolic hydroxy groups or else with aromatic thiol groups with ring-opening. The crosslinking of polycarboxylic acids, for example of polyacrylic acid lattices, with an oxazoline-functionalized polymer produces stable ester compounds, where the reaction of the oxazoline groups with the carboxy groups can often already take place at room temperature. At elevated temperatures in the range from about 80 to 120° C., this reaction generally proceeds rapidly.

Crosslinkers based on oxazoline functionalized polymers, in particular 2-oxazoline functionalized polymers, are commercially available, e.g. EPOCROS® (Nippon Shokubai Co., Ltd, Japan). In principle, two types of crosslinking oxazoline functionalized polymers can be differentiated: a) water-soluble oxazoline functionalized polymers which are obtained by free-radical solution polymerization of the corresponding monomers, and b) oxazoline functionalized polymer dispersions (lattices) which are obtained by emulsion polymerization of the corresponding monomers. The known water-soluble oxazoline functionalized polymers often comprise acrylates, ethoxylated monomer units and oxazoline monomer units.

The patent U.S. Pat. No. 3,509,235 describes a polymer which is obtained by free-radical polymerization of a 2-alkenyloxazoline derivative and optionally further unsaturated monomers. Also described is the crosslinking of a polyacrylic acid polymer using this oxazoline polymer, the reaction taking place for example in a stoichiometric amount. In particular, copolymers of 2-isopropenyloxazoline and acrylates are described and their curable mixtures with acrylate-acrylic acid copolymers. The use of the oxazoline polymers in thermally curing coatings is described.

The patent U.S. Pat. No. 5,300,602 describes a water-soluble polymer comprising oxazoline groups and a polyethylene glycol side chain. The polymer is obtained by polymerization of a monomer mixture which comprises an oxazoline monomer, an acrylic acid ester and optionally a further monomer, e.g. a hydrophilic monomer such as acrylic acid. In particular, the fraction of hydrophilic monomers, which also includes the oxazoline monomers, should be in total at least 50% by weight.

The patent U.S. Pat. No. 2,897,182 describes the preparation of various ethylenically unsaturated oxazoline and oxazine compounds, and their free-radical homo- and copolymerization. The comonomers mentioned are, inter alia, acrylic acid, acrylic esters, acrylamides, acrylonitrile and styrene.

The document JP 2001/310914 describes a water-absorbing resin which comprises a crosslinker comprising oxazoline groups and optionally a water-soluble, unsaturated monomer which comprises acidic groups. The document describes the use of the resin as absorber in hygiene and sanitary articles.

The document JP 2008/069249 describes aqueous polymer resins for the coating of steel, e.g. of automobile parts. The aqueous polymer resin is in particular a curable latex. The polymer comprises an oxazoline monomer, a monomer comprising reactive groups, and a reactive emulsifier.

The document JP 2001/310914 describes a crosslinker comprising oxazoline groups which is intended to serve for the crosslinking of water-absorbing resins, in particular of resins based on polyacrylic acid. The aim is to obtain water-absorbing resins with high water absorption and a small soluble fraction. The crosslinker is e.g. copolymers of acrylates, acrylic acid, methoxypolyethylene glycol and an oxazoline monomer.

Surprisingly, it has been found that a crosslinking copolymer comprising (as monomer building block) oxazoline groups has advantageous properties, in particular improved crosslinking effect and/or binder effect, if it has a fraction of hydrophilic, water-soluble monomers of less than 50% by weight. In particular, the crosslinking copolymer has advantageous properties if it comprises at least 50% by weight of a (meth)acrylate and moreover, as hydrophilic, water-soluble monomers, a monomer comprising sulfonic acid groups and a monomer comprising oxazoline groups.

The result found was surprising since in the prior art water-soluble crosslinking polymers with a relatively high fraction of hydrophilic, water-soluble monomers of at least 50% by weight are described. The copolymers according to the invention have a comparatively low fraction of hydrophilic monomers and therefore a lower solubility in water, but exhibit improved binding properties, e.g. in the binding of cellulose fibers.

The present invention relates to a copolymer A comprising (as building block):

a) at least one monomer (a) selected from the group consisting of $C_{1-20}$-alkyl (meth)acrylates and $C_{8-20}$-vinylaromatics;

b) at least one ethylenically unsaturated monomer (b), which comprises at least one sulfonic acid group (—SO$_3$M);

c) at least one ethylenically unsaturated monomer (c), which comprises at least one oxazoline group;

d) and optionally at least one further monomer (d) and/or additive;

where the fraction of the monomers (b) and (c) is in total less than 50% by weight, based on the total amount of the monomers in the copolymer A.

In a preferred embodiment, in the copolymer A according to the invention the fraction of the monomers (b) and (c) is in total 2 to 49.9% by weight, preferably 10 to 49.5% by weight, particularly preferably 25 to 49% by weight, especially preferably 30 to 45% by weight, based on the total amount of the monomers in the copolymer A.

In a preferred embodiment, the weight ratio of monomers (b) to monomer (c) is in the range from 0.1 to 1, preferably from 0.25 to 0.9; in particular from 0.3 to 0.75, particularly preferably in the range from 0.3 to 0.5.

Typically, the fraction of water-soluble monomers in the copolymer A is less than 50% by weight, based on the total amount of the monomers in the copolymer A.

In the context of the present invention, the expression "water-soluble" refers to a solubility of the corresponding substance in water of at least 100 g/l, preferably at least 200 g/l and particularly preferably at least 300 g/l.

It is known to the person skilled in the art that the solubility in water of substances, in particular of the water-soluble monomers (b) and (c) described hereinbelow, depends on the nature of the aqueous medium, in particular on the pH, and on the temperature. In the context of the present invention, the solubility in water refers in particular to room temperature (25° C.) and to the maximum solubility to be achieved in water. In particular, the solubility in water of the monomers in the context of the present invention refers to the solubility in the aqueous reaction medium described below for the free-radical solution polymerization. The term "water-soluble" comprises in particular also alkali-soluble solutions of water-soluble monomers, i.e. that the monomers are present in the acidic pH range as dispersions and only dissolve in water in the alkaline pH range. In particular, the term "water-soluble" is to be understood such that homogeneous, clear, aqueous phases are obtained.

"Water-soluble monomers" are to be understood as meaning monomers with the aforementioned solubility in water, in particular the expression "water-soluble monomers" in the context of the present invention comprises the aforementioned monomers (b) and (c). In particular, the water-soluble monomers in the context of the invention, in particular the monomers (b) and (c), have a solubility in water of at least 100 g/l preferably at least 200 g/l and particularly preferably at least 300 g/l.

In a particularly preferred embodiment, the copolymer A according to the invention comprises exclusively the monomers (b) and (c) as water-soluble monomers in the context of the present invention. Preferably, the copolymer A according to the invention comprises exclusively the monomers (b) and (c) as water-soluble monomers in the context of the present invention, where the sum of the monomers (b) and (c) is less than 50% by weight, preferably 2 to 49.9% by weight, preferably 10 to 49.5% by weight, particularly preferably 25 to 49% by weight, especially preferably 30 to 45% by weight, based on the total amount of the monomers in the copolymer A.

The aforementioned monomers (a) to (c) and optionally (d) are free-radically polymerizable monomers, i.e. monomers comprising at least one polymerizable unsaturated group, in particular at least one ethylenically unsaturated group.

Preferably, the monomers (a) to (c) and optionally (d) are monoethylenically unsaturated monomers.

In the context of the present invention, copolymer comprising the monomers is understood by the person skilled in the art as meaning that the corresponding copolymer was prepared from the stated monomers, in particular by free-radical polymerization of the stated monomers. The copolymers according to the invention thus comprise the monomer units or are composed of those which correspond to the monomers used. The person skilled in the art is aware that the copolymer can moreover have, depending on the nature of the preparation, starting and/or end groups (e.g. free-radical starter groups) and/or remains of additives, e.g. of surfactants and/or free-radical starters.

In a preferred embodiment, the copolymer A according to the invention consists of the specified monomers (a), (b), (c) and optionally (d), i.e. it was prepared by polymerization exclusively of the stated monomers. In a preferred embodiment, the copolymer A according to the invention consists of the stated monomers (a), (b) and (c), i.e. it was prepared by polymerization exclusively of the stated monomers.

The present invention preferably relates to a water-soluble copolymer A. In particular, the invention relates to a water-soluble copolymer, where the copolymer is not a latex. In the context of the present invention, polymer dispersions which are the product of an emulsion polymerization are referred to as latex.

Monomer (a)

The copolymer A according to the invention comprises at least one monomer (a) selected from the group consisting of $C_{1-20}$-alkyl (meth)acrylates, in particular from $C_{1-12}$-alkyl (meth)acrylates, particularly preferably from $C_{1-8}$-alkyl (meth)acrylates, and $C_{8-20}$-vinylaromatics, in particular from $C_{8-10}$-vinylaromatics.

In the context of the present invention, the term "(meth) acryl" comprises the corresponding acrylates and/or methacrylates or acrylate and/or methacrylate derivatives. For example, the term "methyl (meth)acrylate" comprises methyl acrylate and/or methyl methacrylate. For example, the term "(meth)acrylamide" comprises acrylamide and/or methacrylamide.

In particular, the at least one monomer (a) is a monoethylenically unsaturated, hydrophobic monomer which is in particular not soluble in water, i.e. does not have the above-defined solubility in water. In particular, the at least one monomer (b) has a solubility in water of less than 300 g/l, preferably less than 200 g/l, particularly preferably less than 100 g/l, especially preferably less than 25 g/l.

Typically, the at least one monomer (a) can be selected from the group consisting of: methyl (meth)acrylate, ethyl (meth)acrylate, n-butyl (meth)acrylate, isobutyl (meth)acrylate, t-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate, benzyl (meth)acrylate, styrene, a-methylylstyrene and vinyltoluene.

In a preferred embodiment, the monomer (a) is one or more $C_{1-20}$-alkyl (meth)acrylates, preferably one or more $C_{1-12}$-alkyl (meth)acrylates, particularly preferably one or more $C_{1-8}$-alkyl (meth)acrylates. Particularly preferably, monomer (a) is at least one monomer selected from methyl acrylate (MA), methyl methacrylate (MMA), ethyl acrylate (EA), ethyl methacrylate (EMA), n-butyl acrylate, n-butyl methacrylate, t-butyl acrylate, t-butyl methacrylate, 2-ethylhexyl acrylate and 2-ethylhexyl methacrylate preferably selected from methyl acrylate, methyl methacrylate, n-butyl acrylate and n-butyl methacrylate. Particularly preferably, the monomer (a) is methyl acrylate and/or methyl methacrylate. Particularly preferably, the monomer (a) is n-butyl acrylate and/or n-butyl methacrylate. Particularly preferably, the monomer (a) is a mixture of n-butyl acrylate and methyl methacrylate.

The at least one monomer (a) is present preferably in an amount in the range from 50 to 98% by weight, preferably 50.5 to 85% by weight, particularly preferably 55 to 72% by weight, based on the total amount of the monomers in the copolymer A.

Preferably, the copolymer A according to the invention comprises, as monomer (a), 50 to 98% by weight, preferably 50.5 to 85% by weight, particularly preferably 55 to 72% by weight, based on the total amount of the monomers in the copolymer A, of at least one monomer selected from the group consisting of $C_{1-8}$-alkyl (meth)acrylates, preferably consisting of methyl acrylate (MA), methyl methacrylate (MMA), ethyl acrylate (EA), ethyl methacrylate (EMA), n-butyl acrylate and n-butyl methacrylate, particularly preferably consisting of methyl acrylate, methyl methacrylate, n-butyl acrylate and n-butyl methacrylate.

Monomer (b)

The copolymer A according to the invention comprises at least one ethylenically unsaturated monomer (b), which comprises at least one sulfonic acid group (—$SO_3M$). In particular, monomer (b) is a monoethylenically unsaturated, hydrophilic monomer (b), which comprises at least one sulfonic acid group (—$SO_3M$). M can be in particular hydrogen, ammonium or a metal, preferably a metal. Particularly preferably, the monomer (b) comprises precisely one sulfonic acid group (—$SO_3M$).

Typically, the sulfonic acid group is a group —$SO_3M$, where M is hydrogen, ammonium or a metal, preferably ammonium or a metal. In particular, M is an alkali metal and/or alkaline earth metal, preferably a metal selected from sodium (Na), potassium (K), magnesium (Mg) and calcium (Ca). The at least one sulfonic acid group is particularly preferably a group —$SO_3Na$ and/or —$SO_3K$, particularly preferably —$SO_3Na$.

It is known to the person skilled in the art that the sulfonic acid groups of the monomers (b) can be present in completely or partially deprotonated form, depending on the surrounding medium, in particular depending on pH. Particularly preferably, the monomer (b) during the preparation of the copolymer A and/or the method, described further below, for crosslinking a polyfunctional polymer P is present in the deprotonated form, particularly preferably it is completely present in the deprotonated form. Typically, the monomer (b) is used in the preparation of the copolymer A in deprotonated form, i.e. in the form of a metal salt, in particular of a sodium and/or potassium salt. By using the monomer (b) in the deprotonated or completely deprotonated form, the aim in particular is to ensure that no reaction of the sulfonic acid groups with the oxazoline groups of the monomer (c) takes place.

The hydrophilic monomers (b) are preferably monomers of the general formula (I)

$$H_2C=C(R^1)R^2 \quad (I),$$

where $R^1$ is H or methyl and $R^2$ is a radical which comprises at least one sulfonic acid group, in particular a group —$SO_3M$, where M is a metal selected from sodium, potassium, magnesium and calcium. The at least one sulfonic acid group can be bonded directly to the ethylenic group, or else be bonded to the ethylenic group via one or more linking groups. In particular, $R^2$ is —Y—$SO_3M$, where —Y— is a linking group selected from a bond, $C_{1-10}$-alkylene, phenylene, $C_{1-10}$-alkylphenylene, —C(=C)—O—($C_{1-12}$-alkylene)-; —C(=O)—NH—($C_{1-12}$-alkylene)-; —O—(—$CH_2$—$CH(R^a)$—O)$_m$—; —C(=O)—O(—$CH_2$—$CH(R^a)$—O—)$_m$—; where $R^a$ is H or methyl and m is 1 to 200, preferably 10 to 100.

The group $C_{1-12}$-alkylene is in particular a linking, divalent, linear or branched hydrocarbon radical comprising 1 to 12 carbon atoms. It may preferably be a group —$(CH_2)_n$— where n is 1 to 12; —$CH(CH_3)$—$CH_2$—; —$CH(CH_3)$—$CH_2$—$CH_2$—; —$C(CH_3)_2$—$CH_2$—; —$C(CH_3)_2$—$CH_2$—$CH_2$—; —$C(CH_3)_2$—$CH_2$—$C(CH_3)_2$)—$CH_2$— or —$C(CH_3)_2$—$CH_2$—$CH_2$—$C(CH_3)_2$)—$CH_2$—.

Particularly preferably, —Y— is —C(=O)—NH—($C_{1-12}$-alkylene), in particular —C(=O)—NH—$(CH_2)_n$—, where n=1 to 12, or —C(=O)—NH—$C(CH_3)_2$—$CH_2$—.

Preferably, monomer (b) is a compound of the formula (II):

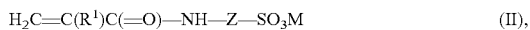

$$H_2C=C(R^1)C(=O)—NH—Z—SO_3M \quad (II),$$

where the radicals and indices have the following meanings:
$R^1$ is H or methyl;
Z is a divalent linking group selected from a bond, $C_{1-10}$-alkylene, phenylene and $C_{1-10}$-alkylphenylene; preferably from $C_{1-10}$-alkylene;
and M is one or more metals, in particular selected from alkali metal and/or alkaline earth metal salts, preferably selected from sodium (Na), potassium (K), magnesium (Mg) and calcium (Ca).

Preferably, Z is a group —$(CH_2)_n$— where n is 1 to 12; —$CH(CH_3)$—$CH_2$—; —$CH(CH_3)$—$CH_2$-$CH_2$—; —$C(CH_3)_2$—$CH_2$—; —$C(CH_3)_2$—$CH_2$—$CH_2$—; —$C(CH_3)_2$—$CH_2$—$C(CH_3)_2$)—$CH_2$— or —$C(CH_3)_2$—$CH_2$—$CH_2$—$C(CH_3)_2$)—$CH_2$—.

Preferably, the monomer (b) is at least one monomer selected from the group consisting of vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid, N-(meth)acrylamidoalkylphosphonic acids and (meth)acryloyloxyalkylphosphonic acids.

Particularly preferably, the monomer (b) is at least one monomer selected from the group consisting of vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid and 2-acrylamido-2,4,4-trimethylpentanesulfonic acid.

The specified acids (monomer (b)) always also include the corresponding salts, in particular ammonium, alkali metal and/or alkaline earth metal salts. Preferably, the aforementioned monomers (b) are the corresponding ammonium and/or metal salts, preferably the corresponding alkali metal and/or alkaline earth metal salts, particularly preferably sodium and/or potassium salts.

Especially preferably, the monomer (b) is 2-acrylamido-2-propanesulfonic acid (AMPS) or salts thereof, in particular 2-acrylamido-2-propanesulfonic acid sodium salt (AMPS-Na) or monomer mixtures consisting of at least 50% by weight AMPS or salts thereof and at least one further monomer (b).

The at least one monomer (b) is present preferably in an amount in the range from 1 to 45% by weight, preferably from 5 to 29.5% by weight, particularly preferably 8 to 15% by weight, based on the total amount of the monomers in the copolymer A.

Monomer (c)

The copolymer A according to the invention comprises at least one ethylenically unsaturated monomer (c), which comprises at least one oxazoline group. In particular, monomer (c) is a monoethylenically unsaturated, hydrophilic monomer (c), which comprises at least one oxazoline group, in particular at least one 2-oxazoline group (also called oxazoline monomer hereinbelow). Preferably, the monomer (c) comprises precisely one oxazoline group, in particular precisely one 2-oxazoline group.

An oxazoline monomer is an organic compound comprising at least one ethylenically unsaturated group and at least one oxazoline group. In the context of the present invention, an oxazoline group refers to a heterocyclic compound which comprises a five-membered ring comprising precisely one oxygen atom and precisely one nitrogen atom. In particular, the oxazoline group is a 2-oxazoline group which can be described by the following structural element.

(III)

Preferably, the monomer (c) is a compound according to formula (IV):

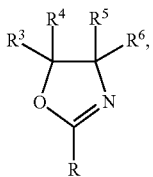

(IV)

where the radicals have the following meanings:

R is a $C_{2-20}$-alkenyl radical comprising at least one ethylenically unsaturated group;

$R^3$, $R^4$, $R^5$, $R^6$ are selected independently of one another from H, halogen, $C_{1-20}$-alkyl, $C_{2-20}$-alkenyl, $C_{6-20}$-aryl, $C_{7-32}$-arylalkyl, $C_{1-20}$-hydroxyalkyl, $C_{1-20}$-aminoalkyl and $C_{1-20}$-haloalkyl, preferably selected from H, halogen and $C_{1-20}$-alkyl.

An ethylenically unsaturated group refers to a terminal C=C double bond.

Alkyl refers to a univalent radical consisting of a linear, branched or cyclic hydrocarbon group, preferably of a linear or branched hydrocarbon chain, in particular comprising 1 to 20 carbon atoms, preferably 1 to 18 carbon atoms, particularly preferably 1 to 12 carbon atoms. For example, the alkyl radical can be methyl, ethyl, n-propyl or isopropyl.

Alkenyl refers to a univalent radical consisting of a linear or branched hydrocarbon chain, in particular comprising 2 to 20 carbon atoms, preferably 2 to 18 carbon atoms, particularly preferably 2 to 12 carbon atoms, which comprises one or more C—C double bonds, where the C—C double bonds can arise within the hydrocarbon chain or at the end of the hydrocarbon chain (terminal C=C double bond). For example, an alkenyl radical can be an allyl radical.

Aryl refers to a substituted or unsubstituted aromatic hydrocarbon group, in particular comprising 6 to 20 carbon atoms. For example, the aryl radical can be a phenyl group.

Arylalkyl refers to a univalent radical derived from a linear or branched alkyl radical, in particular comprising 1 to 20 carbon atoms, preferably 2 to 18 carbon atoms, particularly preferably 2 to 12 carbon atoms, by exchanging one or more hydrogen atoms for an aryl group, where the aryl group is a substituted or unsubstituted aromatic hydrocarbon group, in particular comprising 6 to 14 carbon atoms. For example, the aromatic hydrocarbon group can be phenyl; for example, the arylalkyl radical can be a benzyl radical.

Halogen refers to a substituent selected from fluorine, chlorine, bromine or iodine, preferably chlorine.

Haloalkyl refers to a univalent radical derived from a linear or branched alkyl radical, in particular comprising 2 to 20 carbon atoms, preferably 2 to 18 carbon atoms, particularly preferably 2 to 12 carbon atoms, by exchanging one or more hydrogen atoms for a halogen atom (—F, —Cl, —Br, —I, in particular Cl). The same applies to the radicals hydroxyalkyl and aminoalkyl.

Preferably, R is a $C_{1-10}$-alkenyl radical, preferably a $C_{1-6}$-alkenyl radical, comprising at least one ethylenically unsaturated group. In a preferred embodiment, the radical R comprises precisely one ethylenically unsaturated group. The radical R is in particular selected from vinyl, allyl, isopropenyl (2-propen-2-yl), 2-propen-1-yl, 3-buten-1-yl, or 4-buten-1-yl. Particularly preferably, R is vinyl or isopropenyl, especially preferably isopropenyl.

Preferably, the radicals $R^3$, $R^4$, $R^5$ and $R^6$, independently of one another, are selected from H, halogen, $C_{1-10}$-alkyl, $C_{6-12}$-aryl, $C_{7-13}$-arylalkyl, $C_{1-10}$-alkoxy, $C_{1-10}$-hydroxyalkyl, $C_{1-10}$-aminoalkyl and $C_{1-10}$-haloalkyl; in particular selected from H and $C_{1-6}$-alkyl, particularly preferably from H, methyl, ethyl, n-propyl, isopropyl, n-butyl, n-pentyl and n-hexyl, in particular selected from H, methyl and ethyl.

In a preferred embodiment, at least two of the radicals $R^3$, $R^4$, $R^5$ and $R^6$ are H. In a preferred embodiment, the radicals $R^3$ and $R^4$ are H. In a preferred embodiment, all of the radicals $R^3$, $R^4$, $R^5$ and $R^6$ are H. In a preferred embodiment, at least two of the radicals $R^3$, $R^4$, $R^5$ and $R^6$ are H.

In a preferred embodiment, the radicals $R^3$, $R^4$, $R^5$ and $R^6$, independently of one another, are selected from H, methyl and ethyl, and at least two of the radicals $R^3$, $R^4$, $R^5$ and $R^6$ are H, preferably the radicals $R^3$ and $R^4$ are H.

Particularly preferably, monomer (c) is at least one monomer selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline. Particular preference is given to the use of 2-vinyl-2-oxazoline and/or 2-isopropenyl-2-oxazoline, especially preferably of 2-isopropenyl-2-oxazoline (iPOx).

The at least one monomer (c) is present preferably in an amount in the range from 1 to 45% by weight, preferably from 10 to 39.5% by weight, particularly preferably from 20 to 35% by weight, based on the total amount of the monomers in the copolymer A.

Optional Monomer (d)

The copolymer A according to the invention can optionally comprise at least one further monomer (d) and/or additives. For example, besides the above-described monomers (a), (b) and (c), the copolymer A can optionally comprise further monomers (d), for example selected from unsaturated nitriles, e.g. acrylonitrile and methacrylonitrile; unsaturated amides, e.g. (meth)acrylamide, N-methyl(meth)acrylamide, N,N'-dimethyl(meth)acrylamide, N-methylol (meth)acrylamide, N-butyl(meth)acrylamide, N-cyclohexyl (meth)acrylamide, N-benzyl(meth)acrylamide; vinyl esters and ethers, e.g. vinyl formate, vinyl acetate, vinyl propionate, methyl vinyl ether, ethyl vinyl ether, hydroxyvinyl ethyl ether, hydroxyvinyl propyl ether, hydroxyvinyl butyl ether, and N-vinyl derivatives, e.g. N-vinylformamide, N-vinylacetamide, N-vinylpyrrolidone, N-vinylcaprolactam. The optional monomer can in particular be selected from (meth)acrylamide, N-vinylformamide and N-vinylpyrrolidone.

It is also possible that hydrophilic, nonionic $C_{1-20}$-alkyl (meth)acrylate derivatives are present in the copolymer A as further monomers (d), in which case they can be in particular water-soluble monomers in the context of the present invention. In particular, further monomers that can be used are $C_{1-20}$-alkyl (meth)acrylate derivatives selected from the group consisting of 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, methoxy polyethylene glycol acrylate, ethylene glycol methoxy(meth)acrylate, ethylene glycol (meth)acrylate, diethylene glycol methoxy(meth)acrylate, glycidyl (meth)acrylate and 2-aminoethyl acrylate.

It is also possible that hydrophilic monomers comprising acidic groups are present as further monomers, in which case they can in particular be water-soluble monomers in the context of the present invention. In particular, in this case they are acidic groups, which are present in deprotonated or preferably completely deprotonated form. In particular, further monomers (d) that can be used are acrylic acid, methacrylic acid, crotonic acid, itaconic acid, maleic acid and/or fumaric acid in the form of their alkali metal and/or alkaline earth metal salts.

Typically, the at least one monomer (d) is present in an amount in the range from 0 to 10% by weight, preferably from 0 to 5% by weight, particularly preferably from 0 to 1% by weight, especially preferably from 0.1 to 1% by weight, based on the total amount of the monomers in the copolymer A.

The aforementioned optional further monomers (d) can be water-soluble monomers in the context of the present invention. According to the invention, the copolymer A then comprises in total, comprising monomer (b), monomer (c) and optionally further water-soluble monomers, less than 50% by weight of water-soluble monomers, based on the total amount of the monomers in the copolymer A.

In a particularly preferred embodiment, the copolymer A according to the invention comprises exclusively the monomers (b) and (c) as water-soluble monomers in the context of the present invention, where the sum of the monomers (b) and (c) is less than 50% by weight, based on the total amount of the monomers in the copolymer A.

In a preferred embodiment, the copolymer A according to the invention comprises no monomers which comprise a carboxy group (—COOH) in protonated or deprotonated form. In a preferred embodiment, the copolymer A according to the invention comprises no monomers which comprise an acidic group, e.g. —COOH, —SO$_3$H, —PO$_3$H$_2$, in protonated form. In a preferred embodiment, the copolymer A according to the invention comprises no monomers which comprise a carboxy group (—COOH) in protonated form. Typically, the presence of acidic groups in protonated form during the polymerization of the copolymer A leads to an undesired reaction (secondary reaction) with the oxazoline groups and to a crosslinking of the copolymer A.

For example, the copolymer A can comprise, as further additive, optionally one or more compounds, for example surfactants and free-radical initiators, which are typically used as auxiliaries in the free-radical polymerization (preparation of the copolymer A). Typically, the copolymer A can comprise optional additives in an amount of from 0 to 1% by weight, preferably 0 to 0.1% by weight, preferably 0.01 to 0.1% by weight.

In a preferred embodiment, the invention relates to a copolymer A comprising 50 to 98% by weight, preferably 50.5 to 85% by weight, particularly preferably 55 to 72% by weight, of the at least one monomer (a);

1 to 45% by weight, preferably 5 to 29.5% by weight, particularly preferably 8 to 15% by weight, of the at least one monomer (b);

1 to 45% by weight, preferably 10 to 39.5% by weight, particularly preferably 20 to 35% by weight, of the at least one monomer (c);

0 to 10% by weight, preferably 0 to 5% by weight, particularly preferably 0 to 1% by weight, preferably 0.1 to 1% by weight, of the at least one further monomer (d) and/or additive;

where the fraction of the monomers (b) and (c) is in total less than 50% by weight, preferably 2 to 49.9% by weight, preferably 10 to 49.5% by weight, particularly preferably 25 to 49% by weight, especially preferably 30 to 45% by weight, based on the total amount of the monomers in the copolymer A.

Data in % by weight which relate to the monomers of the copolymer A according to the invention are, unless stated otherwise, based on the total amount of all of the monomers in the copolymer A.

In a particularly preferred embodiment, the invention relates to a copolymer A comprising: 50 to 98% by weight, preferably 50.5 to 85% by weight, particularly preferably 55 to 72% by weight, of the at least one monomer (a), where monomer (a) is at least one $C_{1-12}$-alkyl (meth)acrylate, preferably at least one $C_{1-6}$-alkyl (meth)acrylate selected from methyl acrylate (MA), methyl methacrylate (MMA), ethyl acrylate (EA), ethyl methacrylate (EMA), n-butyl acrylate (n-BA) and n-butyl methacrylate (n-BMA);

1 to 45% by weight, preferably 5 to 29.5% by weight, particularly preferably 8 to 15% by weight, of the at least one monomer (b), where monomer (b) is a monoethylenically unsaturated monomer (b) which comprises precisely one sulfonic acid group (—SO$_3$H), preferably monomer (b) is 2-acrylamido-2-methylpropanesulfonic acid or an alkali metal and/or alkaline earth metal salt of 2-acrylamido-2-methylpropanesulfonic acid, preferably 2-acrylamido-2-methylpropanesulfonic acid sodium salt (AMPS-Na);

1 to 45% by weight, preferably 10 to 39.5% by weight, particularly preferably 20 to 35% by weight, of the at least one monomer (c), where monomer (c) is at least one monomer selected from 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2- oxazoline, 2-isopropenyl-5,5-dimethyl-2-oxazoline and 2-isopropenyl-4,4,5,5-tetramethyl-2-oxazoline, preferably monomer (c) is 2-isopropenyl-2-oxazoline (iPOx);

0 to 10% by weight, preferably 0 to 5% by weight, particularly preferably 0 to 1% by weight, preferably 0.1 to 1% by weight, of the at least one further monomer (d) and/or additive, where the fraction of the monomers (b) and (c) is in total less than 50% by weight, preferably 2 to 49.9% by weight, preferably 10 to 49.5% by weight, particularly preferably 25 to 49% by weight, especially preferably 30 to 45% by weight, based on the total amount of the monomers in the copolymer A.

In a particularly preferred embodiment, the invention relates to a copolymer A comprising: 50.5 to 85% by weight, particularly preferably 55 to 72% by weight, of at least one $C_{1-12}$-alkyl (meth)acrylate selected from methyl acrylate, methyl methacrylate, ethyl acrylate, ethyl methacrylate, n-butyl acrylate and n-butyl methacrylate, as monomer (a);

5 to 15% by weight, preferably 8 to 13% by weight, of 2-acrylamido-2-methylpropanesulfonic acid sodium salt (AMPS-Na) as monomer (b);

10 to 34.5% by weight, preferably 20 to 32% by weight, of isopropenyloxazoline (iPOx) as monomer (c);

0 to 1% by weight of at least one further monomer (d) and/or additive, where the fraction of the monomers (b) and (c) is in total less than 50% by weight, preferably 2 to 49.9% by weight, preferably 10 to 49.5% by weight, particularly preferably 25 to 49% by weight, especially preferably 30 to 45% by weight, based on the total amount of the monomers in the copolymer A.

The present invention moreover relates to a process for the preparation of the above-described copolymer A, where
a) at least one monomer (a) selected from the group consisting of $C_{1-20}$-alkyl (meth)acrylates and $C_{8-20}$-vinylaromatics;
b) at least one ethylenically unsaturated monomer (b), which comprises at least one sulfonic acid group ($-SO_3M$);
c) at least one ethylenically unsaturated monomer (c), which comprises at least one oxazoline group;
d) and optionally at least one further monomer
are polymerized. Preferably, the process the polymerization comprises exclusively the use of the monomers (a), (b) and (c), i.e. no optional monomers (d) are polymerized.

In a preferred embodiment, a monomer mixture comprising at least one monomer (a), at least one monomer (b), at least one monomer (c) and optionally one or more further monomers (d) is polymerized. Preferably, the monomer mixture is a solution of the aforementioned monomers (a), (b), (c) and optionally (d) in water, a polar organic solvent or mixtures thereof. Suitable polar solvents are described below.

In a preferred embodiment, the monomers (a), (b), (c) and optionally (d) are free-radically polymerized. The copolymers A according to the invention can be prepared by the known methods of free-radical polymerization, for example by bulk polymerization, solution polymerization, gel polymerization, emulsion polymerization, dispersion polymerization or suspension polymerization.

The free-radical polymerization (preparation of the copolymer A) takes place typically at temperatures in the range from 0 to 170° C., preferably 20 to 150° C., particularly preferably 50 to 100° C.

In a preferred embodiment, the monomers (a), (b), (c) and optionally (d) are free-radically polymerized, where the free-radical polymerization is carried out as solution polymerization, particularly preferably as solution polymerization in a mixture of water and a polar, organic solvent.

Preferably, the monomers (a), (b), (c) and optionally (d) are polymerized in a free-radical solution polymerization, in which case a monomer mixture is polymerized which comprises a solvent, the monomers (a), (b), (c) and optionally (d), optionally one or more initiators (free-radical initiators) and optionally further additives.

As solvent, the monomer mixture preferably comprises a mixture of water and a polar organic solvent. The polar organic solvent is typically one or more suitable water-miscible organic solvents. The fraction of water in the solvent is generally 0 to 70% by weight, preferably 10 to 60% by weight and particularly preferably 30 to 50% by weight, based on the total solvent.

Organic solvents that can be used are known polar, water-miscible solvents, such as alcohols, esters, ethers or dimethyl sulfoxide (DMSO). Organic solvents that can be used are in particular water-miscible alcohols such as methanol, ethanol, propanol or isopropanol.

The polar organic solvent that can be used is in particular at least one compound selected from the group consisting of methanol, ethanol, isopropanol and ethyl acetate, preferably from methanol, ethanol, n-propanol and isopropanol.

Preferably, the solvent used is a mixture of water and at least one alcohol selected from methanol, ethanol n-propanol and isopropanol, preferably isopropanol, in the weight ratio of 1:2 to 2:1, preferably about 1:1.

Preferably, the process for the preparation of the copolymer A according to the invention comprises the free-radical polymerization of the monomers (a), (b), (c) and optionally (d) using a known initiator (free-radical initiator) for the free-radical polymerization. Typically, the initiator used can be at least one compound selected from peroxide compounds, such as hydroperoxides, peresters and persulfates, azo compounds, substituted ethanes (e.g. benzopinacol), redox systems of inorganic and organic components, heat, UV or other high-energy radiation.

Typical peroxide initiators are, for example, acetyl cyclohexane sulfonyl peroxide, diisopropyl peroxydicarbonate, t-amyl perneodecanoate, t-butyl perneodecanoate, t-butyl perpivalate, t-amyl perpivalate, bis(2,4-dichlorobenzoyl) peroxide, diisononanoyl peroxide, didecanoyl peroxide, dioctanoyl peroxide, dilauroyl peroxide, bis(2-methylbenzoyl) peroxide, disuccinoyl peroxide, diacetyl peroxide, dibenzoyl peroxide, t-butyl per-2-ethylhexanoate, t-butyl-2-ethylhexanoate, bis(4-chlorobenzoyl) peroxide, t-butyl perisobutyrate, t-butyl permaleate, 1,1-bis(t-butyl peroxy)-3,5,5-trimethylcyclohexane, 1,1-bis(t-butyl peroxy)cyclohexane, t-butyl peroxyisopropylcarbonate, t-butyl perisononanoate, t-butyl peracetate, t-amyl perbenzoate, t-butyl perbenzoate, 2,2-bis(t-butylperoxy)butane (di-t-butyl peroxide), 2,2-bis-10-(t-butylperoxy)propane, dicumyl peroxide, 2,5-dimethyl-2,5-bis(t-butylperoxy)hexane, 3-(t-butylperoxy)-3-phenylphthalide, di(t-amyl) peroxide, α,α'-bis(t-butylperoxyisopropyl)benzene, 3,5-bis(t-butylperoxy)-3,5-dimethyl-1,2-dioxolane, di(t-butyl) peroxide, 2,5-dimethyl-2,5-bis(t-butylperoxy)hexyne, 3,3,6,6,9,9-hexamethyl-1,2,4,5-tetraoxacyclononane, p-menthane hydroperoxide, pinane hydroperoxide, diisopropylbenzene, mono-α-hydroperoxide, cumene hydroperoxide, succinyl peroxide, t-butyl hydroperoxide or hydrogen peroxide.

Typical azo initiators are, for example, 4,4'-azobis-4-cyanovaleric acid (ACVA), 2,2'-azobis(2-methylpropionamidine) dihydrochloride, 2,2'-azobis(2-methylpropionitrile) (AIBN), 2,2'-azobis(2-methylbutanenitrile), 2,2'-azobis(2,4-dimethylvaleronitrile), 1,1'-azobis(cyanocyclohexane), 1,1'- azobis(N,N-dimethylformamide), 2,2'-azobis(2-methylbutyronitrile), 2,2'-azobis(4-methoxy-2,4-dimethylvaleronitrile), 2,2'-azobis(2,4,4-trimethylpentane), 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methyl propane), 2,2'-azobis(N,N'-dimethyleneisobutyramidine), 2,2'-azobis(N,N'-dimethyleneisobutyramidine) hydrochloride, 2,2'-azobis(2-amidinopropane), 2,2'-azobis(2-amidinopropane) hydrochloride, 2,2'-azobis(2-methyl-N-[1,1-bis(hydroxymethyl)ethyl]propionamide), azobis(2-amidopropane) dihydrochloride or 2,2'-azobis(2-methyl-N[1,1-bis(hydroxymethyl)-2-hydroxyethyl]propionamide).

Typical redox initiators are, for example, mixtures of an oxidizing agent, such as hydrogen peroxide, peroxodisulfates or aforementioned peroxide compounds, and a reducing agent, such as iron(II) salts, silver(I) salts, cobalt(II) salts, sulfites, hydrogensulfites or thiosulfates. Typical redox systems of inorganic and organic components are combinations of hydrogen peroxide or derivatives thereof and a reducing component, e.g. sodium sulfite, sodium bisulfite, sodium formaldehyde sulfoxylate and hydrazine, ascorbic acid or disodium 2-dihydroxy-2-sulfinatoacetate.

The initiator used is preferably an azo initiator, in particular selected from 2,2'-azobis(2-methylbutyronitrile), 2,2'-azobis(2-methylpropionamidine) dihydrochloride, and 2,2'-azobis(N,N'-dimethyleneisobutyramidine) dihydrochloride.

Typically, the initiator is used in an amount in the range from 0.5 to 5% by weight, preferably from 1 to 4% by weight, based on the monomers.

Preferably, the free-radical polymerization of the monomers (a), (b), (c) and optionally (d) takes place as solution polymerization, where the pH of the solution is in the range from 5 to 8, preferably 6 to 8. Acidic or basic monomers can be completely or partially neutralized before the polymerization. Preferably, acidic groups, e.g. —COOH, —SO$_3$H, —PO$_3$H$_2$, are present entirely in deprotonated form. Typically, the presence of acidic groups in protonated form during the polymerization of the copolymer A leads to an undesired reaction (secondary reaction) with the oxazoline groups.

The monoethylenically unsaturated, hydrophilic monomer (b), which comprises at least one sulfonic acid group (—SO$_3$M), is preferably present in the neutralized form, in particular in the form of the alkali metal salts.

In a preferred embodiment, a monomer mixture comprising at least one monomer (a), at least one monomer (b), at least one monomer (c) and optionally one or more further monomers (d) is polymerized, where the monomer mixture comprises the following components:

7 to 15% by weight, preferably 8 to 10% by weight, based on the total monomer mixture, of the at least one monomer (a);

0.5 to 10% by weight, preferably 1 to 5% by weight, based on the total monomer mixture, of the at least one monomer (b);

0.5 to 10% by weight, preferably 2 to 8% by weight, particularly preferably 25 to 34% by weight, based on the total monomer mixture, of the at least one monomer (c), 0 to 5% by weight, preferably 0 to 1% by weight, based on the total monomer mixture, of the at least one further monomer and/or additive, 0.001 to 2% by weight, preferably 0.01 to 1% by weight, based on the total monomer mixture, of at least one initiator, 58 to 91.991% by weight, preferably 75 to 88.99% by weight, based on the total monomer mixture, of at least one solvent, where the solvent is selected from a polar solvent, e.g. selected from the group consisting of methanol, ethanol n-propanol and isopropanol, and mixtures of a polar solvent and water.

The preferred embodiments described above in connection with the copolymer A and the process for its preparation apply to the specified components.

The copolymer A can typically be isolated from the resulting product mixture by means of relatively customary methods, e.g. by means of precipitation or distillation. However, it is also possible to transfer the copolymers A into water by means of steam distillation and to use them in the form of an aqueous solution as crosslinkers.

Furthermore, the present invention relates to the use of the above-described copolymer A according to the invention as crosslinker, in particular for crosslinking a polyfunctional polymer P comprising at least two functional groups selected from carboxy groups (—COOH), phosphoric acid groups (—OP(OH)$_3$)), phenolic hydroxy groups and aromatic thiol groups, preferably selected from carboxy groups (—COOH). Preferably, the present invention relates to the use of the above-described copolymer A according to the invention as crosslinker for polycarboxylic acid polymers.

With regard to the use according to the invention of the copolymer A, the preferred embodiments described above relating to the copolymer A are applicable.

In the context of the invention, the expression phenolic hydroxy groups refers to hydroxy groups (—OH) which are bonded directly to an aromatic ring, in particular a benzene ring.

In the context of the invention, the expression aromatic thiol groups refers to thiol groups (—SH) which are bonded directly to an aromatic ring, in particular a benzene ring.

In the context of the present invention, the expression polycarboxylic acid polymers refers to polymers which comprise at least two free carboxy groups (—COOH).

The polycarboxylic acid polymer can be, for example, a polymer or copolymer which comprises (meth)acrylic acid and optionally one or more further monoethylenically unsaturated monomers. In particular, the polycarboxylic acid polymer can be poly(meth)acrylic acid and/or copolymers of (meth)acrylic acid and at least one further monomer selected from the group consisting of $C_{1-20}$-alkyl (meth)acrylates, in particular of $C_{1-12}$-alkyl (meth)acrylates; $C_{8-20}$ vinylaromatics, in particular of $C_{8-10}$ vinylaromatics; unsaturated nitriles, e.g. (meth)acrylonitrile; unsaturated amides, e.g. (meth)acrylamide, N-methyl(meth)acrylamide, N,N'-dimethyl(meth)acrylamide, N-methylol(meth)acrylamide, N-butyl(meth)acrylamide, N-cyclohexyl(meth)acrylamide, N-benzyl(meth)acrylamide; vinyl esters; e.g. vinyl formate, vinyl acetate, vinyl propionate; vinyl ethers, e.g. methyl vinyl ether, ethyl vinyl ether, hydroxyvinyl ethyl ether, hydroxyvinyl propyl ether, hydroxyvinyl butyl ether, and N-vinyl derivatives, e.g. N-vinylformamide, N-vinylacetamide, N-vinylpyrrolidone, N-vinylcaprolactam.

In particular, the polycarboxylic acid polymer comprises (meth)acrylic acid and at least one further monomer selected from the group consisting of $C_{1-12}$-alkyl (meth)acrylates, styrene, α-methylstyrene, (meth)acrylamide, N-methyl(meth)acrylamide, N,N'-dimethyl(meth)acrylamide, N-methylol(meth)acrylamide, N-butyl(meth)acrylamide, N-cyclohexyl(meth)acrylamide and N-benzyl(meth)acrylamide.

In a preferred embodiment, the polycarboxylic acid polymer is a polycarboxylic acid polymer dispersion comprising at least two carboxy groups (—COOH). In particular, the polycarboxylic acid polymer dispersion is the product of an emulsion polymerization, also referred to as latex. Preferably, the polycarboxylic acid polymer is a polymer dispersion (latex) comprising (meth)acrylic acid and/or itaconic acid and at least one further monomer selected from the group consisting of $C_{1-20}$-alkyl (meth)acrylates, in particular of $C_{1-12}$-alkyl (meth)acrylates; $C_{8-20}$ vinylaromatics, in particular of $C_{8-10}$ vinylaromatics; unsaturated nitriles, e.g. (meth)acrylonitrile; unsaturated amides, e.g. (meth)acrylamide, N-methyl(meth)acrylamide, N,N'-dimethyl(meth)acrylamide, N-methylol(meth)acrylamide, N-butyl(meth)acrylamide, N-cyclohexyl(meth)acrylamide, N-benzyl(meth)acrylamide; vinyl esters; e.g. vinyl formate, vinyl acetate, vinyl propionate; vinyl ethers, e.g. methyl vinyl ether, ethyl vinyl ether, hydroxyvinyl ethyl ether, hydroxyvinyl propyl ether, hydroxyvinyl butyl ether, and N-vinyl derivatives, e.g. N-vinylformamide, N-vinylacetamide, N-vinylpyrrolidone, N-vinylcaprolactam.

Preferably, the polycarboxylic acid polymer is a polymer dispersion (latex) comprising (meth)acrylic acid and/or itaconic acid and at least one further monomer selected from the group consisting of styrene, methyl (meth)acrylate, n-butyl (meth)acrylates, ethylhexyl (meth)acrylate and (meth)acrylamide.

Typically, the polycarboxylic acid polymer comprises 0.1 to 10% by weight, preferably 0.1 to 5% by weight, of (meth)acrylic acid and/or itaconic acid and 50 to 99.9% by weight, preferably 50 to 99.9% by weight, of at least one further above-described monomer.

In particular, it can be a polymer dispersion (latex) which was produced starting from a polystyrene seed latex.

The implementation of the free-radical emulsion polymerization of ethylenically unsaturated monomers is known to the person skilled in the art and described widely in the prior art.

Typically, the polymer dispersion (latex) has a solids content in the range from 20 to 60% by weight, preferably 40 to 60% by weight. Typically, the polymer dispersion (latex) has a particle size in the range from 50 to 500 nm, preferably from 100 to 200 nm. Typically, the polymer dispersion (latex) has a glass transition temperature in the range from −40 to 100° C., preferably from −10 to 40° C.

Typically, the polymer dispersion (latex) has an acid number in the range from 0.2 to 20% by weight. Acid number is typically used to refer to the weight ratio of the monomers which have one acid group, relative to the overall monomers.

Typically, polycarboxylic acid polymers that can be used are commercially available latex dispersions, for example dispersions from the Acronal® product series of BASF SE.

In particular, the use of the copolymer A according to the invention relates to the use as binder in the production of adhesives, sealants, synthetic resin renders, paper coating slips, fiber nonwovens, flexible roof coverings and paints, and also in sand consolidation, as component in the production of textile or leather auxiliaries and impact modifier or for modifying mineral binders and plastics. In particular, the use of the copolymer A according to the invention relates to the use as crosslinker in coating compositions and/or binder compositions which are used for example in the manufacture of paper, cardboard or hard particle board.

By using the copolymer A according to the invention, it is possible for example to improve the binding and crosslinking of cellulose fibers, for example in paper products.

Moreover, the invention relates to a method for crosslinking a polyfunctional polymer P comprising at least two functional groups selected from carboxy groups, phosphoric acid groups, phenolic hydroxy groups and aromatic thiol groups, where at least one copolymer A according to the invention is added to the polyfunctional polymer P. The crosslinking can take place at room temperature. It is also possible to heat the mixture comprising the polymer P and the copolymer A according to the invention to temperatures of from 60 to 200° C., preferably 80 to 150° C.

Typically, the crosslinking takes place as a result of the evaporation and/or vaporization of a volatile, basic compound present in the mixture, thereby resulting in a lowering of the pH and a protonation of the above-described functional groups of the polyfunctional polymer P, e.g. carboxy groups (—COOH), phosphoric acid groups (—OP(OH)$_3$)), phenolic hydroxy groups and aromatic thiol groups. The protonated groups can then typically react with the oxazoline groups of the copolymer A according to the invention with ring opening, which leads to the desired crosslinking.

The above-described preferred embodiments of the copolymer A and of the polyfunctional polymer P apply accordingly to the method according to the invention for crosslinking. To the method according to the invention for crosslinking, the embodiments described below are likewise applicable.

Furthermore, the present invention relates to a composition, in particular a coating composition and/or a binder composition, comprising
i) at least one above-described copolymer A; comprising:
   a) at least one monomer (a) selected from the group consisting of $C_{1-20}$-alkyl (meth)acrylates and $C_{8-20}$-vinylaromatics;
   b) at least one ethylenically unsaturated monomer (b), which comprises at least one sulfonic acid group (—SO$_3$M);
   c) at least one ethylenically unsaturated monomer (c), which comprises at least one oxazoline group;
   d) and optionally at least one further monomer (d) and/or additive;
   where the fraction of the monomers (b) and (c) is in total less than 50% by weight, based on the total amount of the monomers in the copolymer A;
ii) at least one polyfunctional polymer P comprising at least two functional groups selected from carboxy groups (—COOH), phosphoric acid groups (—OP(OH)$_3$)), phenolic hydroxy groups and aromatic thiol groups, preferably selected from carboxy groups (—COOH), and
iii) at least one volatile, basic compound, in particular ammonia.

The above-described preferred embodiments apply accordingly to the copolymer A and the polyfunctional polymer P.

In particular, the present invention relates to a composition, in particular a coating composition and/or a binder composition, comprising
i) at least one above-described copolymer A,
ii) at least one polyfunctional polymer P, where it is a latex which comprises (meth)acrylic acid and at least one further monomer selected from styrene, α-methylstyrene, $C_{1-12}$-alkyl (meth)acrylate, (meth)acrylamide and (meth)acrylonitrile, and
iii) at least one volatile, basic compound, in particular ammonia.

In particular, the invention relates to a composition comprising i) 10 to 80% by weight, preferably 20 to 50% by weight, based on the total composition, of the at least one above-described copolymer A;
ii) 10 to 80% by weight, preferably 20 to 50% by weight, based on the total composition, of the at least one polyfunctional polymer P;
iii) 0.1 to 20% by weight, preferably 1 to 10% by weight, based on the total composition, of at least one volatile, basic compound, in particular ammonia,
iv) 0 to 79.9% by weight, preferably 0 to 60% by weight, based on the total composition, of at least one solvent, in particular water and/or a polar organic solvent, in particular selected from methanol, ethanol, isopropanol and ethyl acetate.

The invention relates moreover to a method for crosslinking, where the above-described compositions are left to stand at room temperature and/or are heated to temperatures of from 60 to 200° C., preferably 80 to 150° C.

Typically, the crosslinking of the above-described composition takes place by the evaporation and/or vaporization of the at least one volatile, basic compound, thus resulting in a lowering of the pH and a protonation of the above-described functional groups of the polyfunctional polymer P, e.g. carboxy groups (—COOH), phosphoric acid groups (—OP(OH)$_3$)), phenolic hydroxy groups and aromatic thiol groups. The protonated groups can then typically react with the oxazoline groups of the copolymer A according to the invention with ring opening, which leads to the desired crosslinking.

To the method according to the invention for crosslinking, the above-described preferred embodiments of the copolymer A and of the polyfunctional polymer P apply accordingly.

Moreover, the present invention relates to the use of the above-described composition comprising
i) at least one above-described copolymer A according to the invention,
ii) at least one polyfunctional polymer P comprising at least two functional groups selected from carboxy groups (—COOH), phosphoric acid groups (—OP(OH)$_3$)), phenolic hydroxy groups and aromatic thiol groups, preferably selected from carboxy groups (—COOH), and
iii) at least one volatile, basic compound, in particular ammonia,
as binder in the production of adhesives, sealants, synthetic resin renders, paper coating slips, fiber nonwovens, flexible roof coverings and paints, and also in sand consolidation, as component in the production of textile or leather auxiliaries and impact modifier or for modifying mineral binders and plastics.

The above-described preferred embodiments are applicable.

The invention is described in more detail by the examples and claims below.

The following abbreviations are used:
AMPS-Na 2-acrylamido-2-propanesulfonic acid sodium salt
iPOx isopropenyloxazoline
IT internal temperature
MMA methyl methacrylate
nBA n-butyl acrylate
MPEG MA methoxypoly(ethylene glycol) methacrylate
demin. water demineralized water
IPA isopropanol
h hour

EXAMPLE 1

Preparation of AMPS Copolymers

In a 2 l glass reactor with anchor stirrer, thermocouple and reflex condenser, the initial charge, which consisted of 635 g of demin. water, 16 g of an azo free-radical initiator (Wako V 59, 2,2'-azobis(2-methylbutyronitrile) and 680 g of isopropanol, was heated under a gentle stream of N2 to 70° C. IT. When the IT was reached, the following feeds were started:

Feed 1: 63 g of 2-acrylamido-2-propanesulfonic acid sodium salt (AMPS-Na, 50% strength solution in water), 10 g of demin. water, Feed 2: 88 g of n-butyl acrylate and 104 g of methyl methacrylate Feed 3: 96 g of isopropenyloxazoline.

The feeds were metered in over 2 h. When the feeds were complete, the mixture was after-polymerized for 9 hours at 70° C. Following subsequent steam distillation, an opaque polymer solution was obtained (copolymer P1).

Three further copolymers P2, P3 and P4 were prepared analogously to the above-described experimental procedure. The reaction mixtures for producing the copolymers P1 to P4 are summarized in Table 1 below.

TABLE 1

Preparation of the AMPS copolymers

| Copolymer | nBA [g] | MMA [g] | AMPS-Na [g] | iPOx [g] | Initiator [g] | Demin. water [g] | IPA [g] | nBA + MMA [% by weight] | iPOx + AMPS-Na [% by weight] |
|---|---|---|---|---|---|---|---|---|---|
| P1 | 88 | 104 | 32 | 96 | 16 | 645 | 680 | 60.0 | 40.0 |
| P2 | 0 | 150 | 124 | 36 | 2.5 | 13.6 | 580 | 48.4 | 51.6 |
| P3 | 0 | 30 | 18 | 12 | 3 | 270 | 270 | 50.0 | 50.0 |
| P4 | 104 | 120 | 32 | 64 | 16 | 645 | 680 | 70.0 | 30.0 |

The copolymers P1 and P4 are copolymers according to the invention; the copolymers P2 and P3 are comparative examples.

EXAMPLE 2

(Comparative Example)—Preparation of a Copolymer Comprising Polyethylene Glycol (Polymer P5)

In a 2 l glass reactor with anchor stirrer, thermocouple and reflex condenser, the initial charge, which consisted of 1512 g of demin. water and 18 g of an azo free-radical initiator (Wako V 50, 2,2'-azobis(2-methylpropionamidine) dihydrochloride), was heated under a gentle stream of N2 to 60° C. IT. When the IT was reached, the following feeds were started:

Feed 1: 90 g of n-butyl acrylate and 90 g of methyl methacrylate
Feed 2: 108 g of isopropanol and 72 g of MPEG MA The feeds were metered in over 2 h. At the end of these feeds, the mixture was after-polymerized for 9 hours at 60° C. This gave a white dispersion of the copolymer P5.

EXAMPLE 3

Synthesis of a Model Dispersion (Binder I)

The following monomer emulsion was prepared:

| | |
|---|---|
| 287.96 g | water, |
| 28.13 g | $C_{12}/C_{14}$-alkylpolyethylene glycol sulfate (Disponil FES 77 from BASF SE, 32% strength solution in water), |
| 15.0 g | C16/C18 fatty alcohol polyethylene glycol (Lutensol AT18 from BASF SE, 20% strength solution in water), |
| 282 g | methyl methacrylate, |
| 300 g | n-butyl acrylate, |
| 12 g | acrylic acid and |
| 12 g | acrylamide (50% strength solution in water). |

In a 2 liter reactor with anchor stirrer, thermocouple and reflex condenser, 210.5 g of water were initially introduced together with 21.82 g of polystyrene seed latex (from BASF SE, 33% strength in water) and 15.0 g of a 4% strength aqueous sodium peroxodisulfate solution and stirred at 90° C. for 10 min. Then, a further 937.09 g of the monomer emulsion and a further 60 g of a 7% strength aqueous sodium peroxodisulfate solution were metered in over a period of 3 h. After the end of these feeds, the solution was stirred for a further 60 min at 90° C. The dispersion was then cooled to room temperature and neutralized to pH 8.1 with 25% strength ammonia solution.

The dispersion had a solids content of 49.9%, the average particle size was 139 nm (measured by means of hydrodynamic chromatography). The glass transition temperature $T_g$ was 16.9° C.

EXAMPLE 4

Synthesis of a Model Dispersion (Binder II) for Fiber Bonding Applications

The following monomer emulsion was prepared:

| | |
|---|---|
| 142.5 g | water, |
| 25.0 g | 3% strength sodium pyrophosphate solution, |
| 3.33 g | sodium salt of dodecyldiphenyl ether disulfonic acid (Dowfax 2A1 from Dow Chemical, 45% strength solution in water), |
| 26.79 g | sodium lauryl polyethoxysulfate (Disponil FES27 from BASF SE, 28% strength solution in water), |
| 395.48 g | styrene, |
| 303.75 g | n-butyl acrylate, |
| 36.75 g | acrylic acid and |
| 93.5 g | methacrylamide (15% strength solution in water). |

In a 2 liter reactor with anchor stirrer, thermocouple and reflex condenser, 427.21 g of water were initially introduced together with 14.09 g of polystyrene seed latex (BASF SE, 33% strength in water), 17.7 g of a 7% strength aqueous sodium peroxodisulfate solution and stirred at 95° C. for 5 min. Then, 1027.09 g of the monomer emulsion and 41.25 g of a 7% strength sodium peroxodisulfate solution were metered in over a period of 140 min. After the end of these feeds, the solution was stirred for a further 15 min at 90°.

After cooling to 75° C., 7.5 g of tert-butyl hydroperoxide solution (10% strength solution in water) and 5.08 g of acetone bisulfite (13.3% strength solution in water) were metered in over 60 min.

The dispersion was then cooled to room temperature.

The dispersion had a solids content of 49.3%, the particle size (measured by means of hydrodynamic chromatography) was 186 nm. The glass transition temperature (measured by means of DSC) was 36° C.

EXAMPLE 5

Determination of the Degree of Swelling of the Copolymers

To produce crosslinked films, the model dispersion according to example 3 (binder I) was mixed in each case with a polymer solution comprising in each case one of the copolymers P2, P3 or P4 (oxazoline copolymer).

Here, the amounts of binder and oxazoline copolymer were chosen such that an equimolar ratio of carboxylic acid groups to oxazoline groups was present.

The formulations were diluted to a solids content of 20% by weight and placed into a silicone mold for the purposes of film formation. Film formation took place a) over a period of 1 week, b) over a period of 4 weeks or c) over a period of 1 week with subsequent heating at 100° C. for 1 hour.

The films obtained in this way were determined as regards their swellability in tetrahydrofuran (THF). For this, the films were shaken in a laboratory shaker in THF for 24 h at room temperature. They were then removed from the THF, patted dry and weighed.

The degree of swelling of the films is determined in accordance with the following formula:

Degree of swelling [%]=weight of the swollen film/weight of the dry film*100

A low degree of swelling means a high crosslinking of the film.

The results are summarized in Table 2 below:

TABLE 2

| | Degree of swelling of the films in THF | | |
|---|---|---|---|
| | Degree of swelling [%] | | |
| Copolymer | a) after 1 week | b) after 4 weeks | c) after 1 h and heating at 100° C. |
| P4 | 45 | 10 | 6 |
| P2 | 24 | 16 | 12 |
| P3 | 64 | 20 | 12 |
| P5 | 29 | 10 | 8 |

The copolymer P4 according to the invention exhibits lower degrees of swelling, especially for films which have been produced over 4 weeks or with heating at 100° C., compared to the comparative experiments P2 and P3, which have a fraction of iPOx and AMPS-Na greater than or equal to 50% by weight. The copolymer P4 according to the invention exhibits somewhat lower or similar degrees of swelling, especially for films which have been produced over 4 weeks or with heating at 100° C., compared to the comparative experiment P5 (MPEG/MA copolymer).

EXAMPLE 6

Investigation of the Mechanical Properties

Films with a thickness of 600 μm were produced. The binder used was the model dispersion according to example 3 (binder I). Sample bodies S3A were punched out from the films and subjected to a tensile test in accordance with ISO37. Here, the tensile stress σ (in Pa or MPa) is determined as a function of the elongation (distance). The clamping pressure was 2 bar, the test rate was 100 mm/min. The tensile experiment was carried out at 23° C.

Moreover, for comparison, the commercially available crosslinker Epocros® WS700 (Nippon Shokubai) was used, which is an oxazoline-functionalized MPEG-MA copolymer.

The results of the tensile experiments are summarized in Table 3 below:

TABLE 3

Tensile elongation experiment

| Experiment No. | Crosslinker (copolymer) | Tensile stress [MPa] Elongation | | | |
| --- | --- | --- | --- | --- | --- |
| | | 50% | 100% | 150% | 200% |
| E6-1 | none | 3.2 | 3.9 | 4.8 | 6.2 |
| E6-2 | copolymer P5 | 4.2 | 5.7 | 8.0 | 11.1 |
| E6-3 | Epocros ® WS700 | 4.8 | 6.5 | 8.7 | 11.7 |
| E6-4 | Copolymer P1 | 7.5 | 8.6 | 10.7 | 13.7 |

EXAMPLE 7

Investigation Re Fiber Binding Applications

The model dispersion according to example 4 (binder II) was mixed with the oxazoline copolymers P4 and P5. For this, 0.4 mol eq amount of the oxazoline copolymer, based on the amount of acid used in the formulation, was added.

As comparison, a commercially available, formaldehyde-free self-crosslinking dispersion, Acronal® 2416, was used.

The described crosslinking dispersions were used for producing impregnated filter papers, the crude paper used being a cellulose filter paper with a weight per area of 103 g/m².

To apply the aqueous binder liquors (impregnation), the paper sheets were each passed through 10.0% strength by weight aqueous binder liquors in a longitudinal direction by means of a continuous PES sieve belt with a belt running speed of 2.0 m per minute. By means of absorption of the aqueous binder liquors, the wet application was adjusted to 206 g/m² (corresponding to 20.6 g/m² of binder, calculated as solid). The impregnated filter papers obtained in this way were dried in a Mathis oven on a plastic mesh as support for 5 minutes at 90° C. with maximum hot-air flow, and then directly crosslinked in a Mathis oven for 1 minute at 160° C. at maximum hot-air flow. After cooling to room temperature, in each case 10 test pieces were punched out in dumbbell shape of 115 mm in length with a test margin of 6 mm in width longitudinally and transversely to the direction of travel. The resulting test pieces were then stored for 24 hours at 23° C. and 50% relative atmospheric humidity in a climatically controlled space.

The investigations as to mechanical stability described below were carried out. The results are summarized in Table 4.

i) Determination of the breaking strength and elongation

The breaking strength was determined under standard atmospheric conditions (23° C. and 50% relative atmospheric humidity) on a tensile testing machine from Zwick-Roell, model Z005. The test pieces here were clamped vertically into the tensioning device such that the free clamped length was 70 mm. The clamped test pieces were then pulled apart in the opposite direction at a speed of 50 mm per minute until the test pieces broke. The breaking strength was given in N/mm². In each case, 5 measurements were carried out in the longitudinal and transverse direction. The values given in Table 4 are in each case the average value of these measurements.

The elongation was calculated starting from the clamped length and with the change in length measured upon breakage of the test piece. The elongation was given in %. The value given in Table 4 is the average value from 5 individual measurements.

ii) Determination of wet breaking strength and elongation

To determine the wet breaking strength, the test pieces were stored in 2% strength solution of a sodium alkylsulfonate (emulsifier E 30) for 2 minutes. The excess solution was then dabbed away using a cotton fabric. The wet breaking strength was determined on a tensile testing machine from Zwick-Roell, model Z005. For this, the test pieces were clamped vertically into the tensioning device such that the free clamped length was 70 mm. The clamped test pieces were then pulled apart in the opposite direction at a speed of 50 mm per minute until the test pieces broke. The breaking strength was given in N/mm². In each case 5 measurements were carried out in the longitudinal and transverse direction. The values given in Table 4 are in each case the average value of these measurements.

The elongation is calculated starting from the clamped length with the change in length measured upon breakage of the test piece. The elongation was given in %. The value given in Table 4 is the average value from 5 individual measurements.

iii) Determination of hot breaking strength and elongation

To determine the hot breaking strength, 5 test strips measuring 50×200 mm were stamped from the impregnated filter paper sheets longitudinally relative to the direction of travel.

The hot breaking strength was determined on a tensile testing machine from Zwick-Roell, model Z010, the clamping device of which was located in a heatable chamber. The test pieces were clamped vertically into a tensioning device in the chamber preheated to 150° C. such that the free clamped length was 100 mm. After a waiting time of 1 minute at the desired temperature (from re-reaching 149° C.), the clamped test strips were pulled apart in the opposite direction at a speed of 50 mm per minute until the test strips broke. The hot breaking strength was given in N/m (based on the sample width). 5 separate measurements were made in each case. The values given in Table 4 are in each case the average value of these measurements.

The elongation is calculated starting from the clamped length with the change in length measured upon breakage of the test piece. The elongation was given in %. The value given in Table 4 is the average value from 5 individual measurements.

iv) Determination of the bursting pressure

The bursting pressure was determined on a tester from Zwick/Roell model Z 005 with test module bursting pressure. A membrane with a thickness of 0.86 mm was used, which bulges at a pressure of 30 kPa by 9.0 mm. The conveyed amount of the hydraulic system was 95 ml/min. The determination of the bursting pressure is described in DIN ISO 2758 and DIN ISO 2759.

To determine the bursting pressure, 5 samples measuring 175×230 mm were cut from the impregnated filter paper sheets. The samples were conditioned for at least 15 h under standard atmospheric conditions (23° C. and 50% relative atmospheric humidity).

The samples were clamped over the elastic, circular membrane so that they could freely bulge with the membrane. The membrane was bulged with a uniform conveyed amount of the hydraulic liquid until the sample burst. The maximum applied pressure in kPa is referred to as bursting pressure.

For the purposes of wet testing, the samples were placed for 2 minutes into a 2% strength solution of a sodium alkylsulfonate (emulsifier E 30). It is then dabbed dry with a cotton fabric and measured as described. The value given in Table 4 is the average value from 5 individual measurements.

TABLE 4

Results of the mechanical investigation of the impregnated filter papers

| | | Experiment No. | | |
|---|---|---|---|---|
| | | E7-1 | E7-2 | E7-3 |
| Binder | | Binder II | Binder II | Acronal 2416 |
| Crosslinker | | Copolymer P4 | Copolymer P5 | |
| Breaking strength in N/mm² dry | longitudinal | 10.2 | 8.7 | 7.8 |
| | transverse | 7.8 | 7.0 | 6.3 |
| Elongation in % dry | longitudinal | 3.6 | 3.6 | 3.4 |
| | transverse | 4.9 | 5.1 | 4.3 |
| Breaking strength in N/mm² wet | longitudinal | 4.1 | 3.2 | 1.7 |
| | transverse | 2.4 | 2.3 | 1.4 |
| Elongation in [%] wet | longitudinal | 6.5 | 6.6 | 4.0 |
| | transverse | 7.7 | 8.0 | 5.4 |
| Breaking strength in N/m dry, 150° C. | longitudinal | 1587 | 1321 | 1307 |
| Elongation in % dry, 150° C. | longitudinal | 2.2 | 1.9 | 1.9 |
| Bursting pressure in kPa | dry | 354 | 340 | 310 |
| | wet | 242 | 166 | 93 |

When using the copolymer P4 according to the invention as crosslinker, the impregnated filter papers have a considerably improved mechanical stability compared to experiments E7-2 and E7-3. The crosslinker according to the invention has an improved fiber binding.

The invention claimed is:

1. A copolymer A, comprising:
at least one monomer (a) selected from the group consisting of a $C_{1-20}$-alkyl (meth)acrylate, a $C_{8-20}$-vinylaromatic, and a combination thereof;
at least one ethylenically unsaturated monomer (b), which comprises at least one sulfonic acid group (—SO₃M), wherein M is one or more metals;
at least one ethylenically unsaturated monomer (c), which comprises at least one oxazoline group;
and optionally at least one further monomer (d) and/or additive,
wherein a fraction of the monomers (b) and (c) is in total less than 50% by weight, based on the total amount of the monomers in the copolymer A, and
wherein the copolymer A is a water-soluble polymer having a solubility in water of at least 100 g/l.

2. The copolymer according to claim 1, wherein the fraction of the monomers (b) and (c) is in total 2 to 49.9% by weight, based on the total amount of the monomers in the copolymer A.

3. The copolymer according to claim 1, wherein the copolymer A comprises exclusively the monomers (b) and (c) as water-soluble monomers.

4. The copolymer according to claim 1, wherein the copolymer A comprises, as the monomer (a), 50 to 98% by weight, based on the total amount of the monomers in the copolymer A, of at least one monomer of a $C_{1-8}$-alkyl (meth)acrylate.

5. The copolymer according to claim 1, wherein the monomer (b) is a compound of the formula (II)

$$H_2C=C(R^1)C(=O)-NH-Z-SO_3M \qquad (II),$$

where:
$R^1$ is H or methyl;
Z is a divalent linking group which is selected from the group consisting of a bond, $C_{1-10}$-alkylene, phenylene and $C_{1-10}$-alkylphenylene;
and M is one or more metals.

6. The copolymer according to claim 1, wherein the monomer (c) is a compound according to formula (IV)

where:
R is a $C_{2-20}$-alkenyl radical comprising at least one ethylenically unsaturated group; and
$R^3$, $R^4$, $R^5$, $R^6$ are selected independently of one another from the group consisting of H, halogen, $C_{1-20}$-alkyl, $C_{2-20}$-alkenyl, $C_{6-20}$-aryl, $C_{7-32}$-arylalkyl, $C_{1-20}$-hydroxyalkyl, $C_{1-20}$-aminoalkyl and $C_{1-20}$-haloalkyl.

7. The copolymer according to claim 6, wherein the radicals $R^3$, $R^4$, $R^5$, $R^6$, independently of one another, are H or $C_{1-6}$-alkyl.

8. The copolymer according to claim 1, wherein the copolymer A comprises
50 to 98% by weight of the at least one monomer (a);
1 to 45% by weight of the at least one monomer (b);
1 to 45% by weight of the at least one monomer (c); and
0 to 10% by weight of the at least one further monomer (d) and/or additive.

9. The copolymer according to claim 1, wherein the copolymer A comprises 50 to 98% by weight of the at least one monomer (a), where the monomer (a) is at least one $C_{1-12}$-alkyl (meth)acrylate;

1 to 45% by weight of the at least one monomer (b), where the monomer (b) is a monoethylenically unsaturated monomer which comprises precisely one sulfonic acid group;

1 to 45% by weight of the at least one monomer (c), where the monomer (c) is at least one monomer selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2isopropenyl -4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline, and 0 to 10% by weight of the at least one further monomer (d) and/or additive.

10. A process for preparing the copolymer A according to claim 1, the process comprising:

polymerizing at least one monomer (a) selected from the group consisting of a $C_{1-20}$-alkyl (meth)acrylate, a $C_{8-20}$-vinylaromatic, and a combination thereof; at least one ethylenically unsaturated monomer (b), which comprises at least one sulfonic acid group (—$SO_3M$); at least one ethylenically unsaturated monomer (c), which comprises at least one oxazoline group; and optionally at least one further monomer.

11. The process according to claim 10, wherein the monomers (a), (b), (c) and optionally (d) are free-radically polymerized, where the free-radical polymerization is carried out as solution polymerization.

12. A method for crosslinking a polyfunctional polymer P comprising at least two functional groups selected from the group consisting of a carboxy group, a phosphoric acid group, a phenolic hydroxy group, and an aromatic thiol group, the method comprising:

adding at least one copolymer A according to claim 1 to the polyfunctional polymer P.

13. A composition, comprising:
i) at least one copolymer A according to claim 1;
ii) at least one polyfunctional polymer P comprising at least two functional groups selected from the group consisting of a carboxy group, a phosphoric acid group, a phenolic hydroxy group, and an aromatic thiol group; and
iii) at least one volatile, basic compound.

14. A method of producing an adhesive, a sealant, a synthetic resin render, a paper coating slip, a fiber nonwoven, a flexible roof coating, or a paint, the method comprising:

adding a binder comprising the composition according to claim 13.

15. A method for consolidating sand, comprising:
adding a binder comprising the composition according to claim 13.

16. A method for producing a textile or leather auxiliary, an impact modifier, mineral binder, or a plastic, comprising:
adding the composition according to claim 13.

* * * * *

UNITED STATES PATENT AND TRADEMARK OFFICE
CERTIFICATE OF CORRECTION

PATENT NO. : 10,336,849 B2  
APPLICATION NO. : 15/321116  
DATED : July 2, 2019  
INVENTOR(S) : Matthias Zorn et al.

Page 1 of 1

It is certified that error appears in the above-identified patent and that said Letters Patent is hereby corrected as shown below:

In the Specification

Column 3, Line 52, delete "100 g/l" and insert -- 100 g/l, --, therefor.

Column 12, Line 48, delete "(t-butyl peroxy)-" and insert -- (t-butylperoxy)- --, therefor.

Column 12, Line 49, delete "(t-butyl peroxy)" and insert -- (t-butylperoxy) --, therefor.

Column 13, Lines 10-11, delete "(2-methyl propane)," and insert -- (2-methylpropane), --, therefor.

Column 19, Line 23 (approx.), delete "C16/C18" and insert -- $C_{16}/C_{18}$ --, therefor.

In the Claims

Column 25, Line 12 (approx.), Claim 9, delete "oxazoline,2-vinyl" and insert -- oxazoline, 2-vinyl --, therefor.

Column 25, Line 16 (approx.), Claim 9, delete "2isopropenyl -4-methyl" and insert -- 2-isopropenyl-4-methyl --, therefor.

Signed and Sealed this  
Twenty-eighth Day of April, 2020

Andrei Iancu  
*Director of the United States Patent and Trademark Office*